June 1, 1937.  E. F. KELLEY  2,082,341
TIRE DEFLATION INDICATOR
Filed June 22, 1934
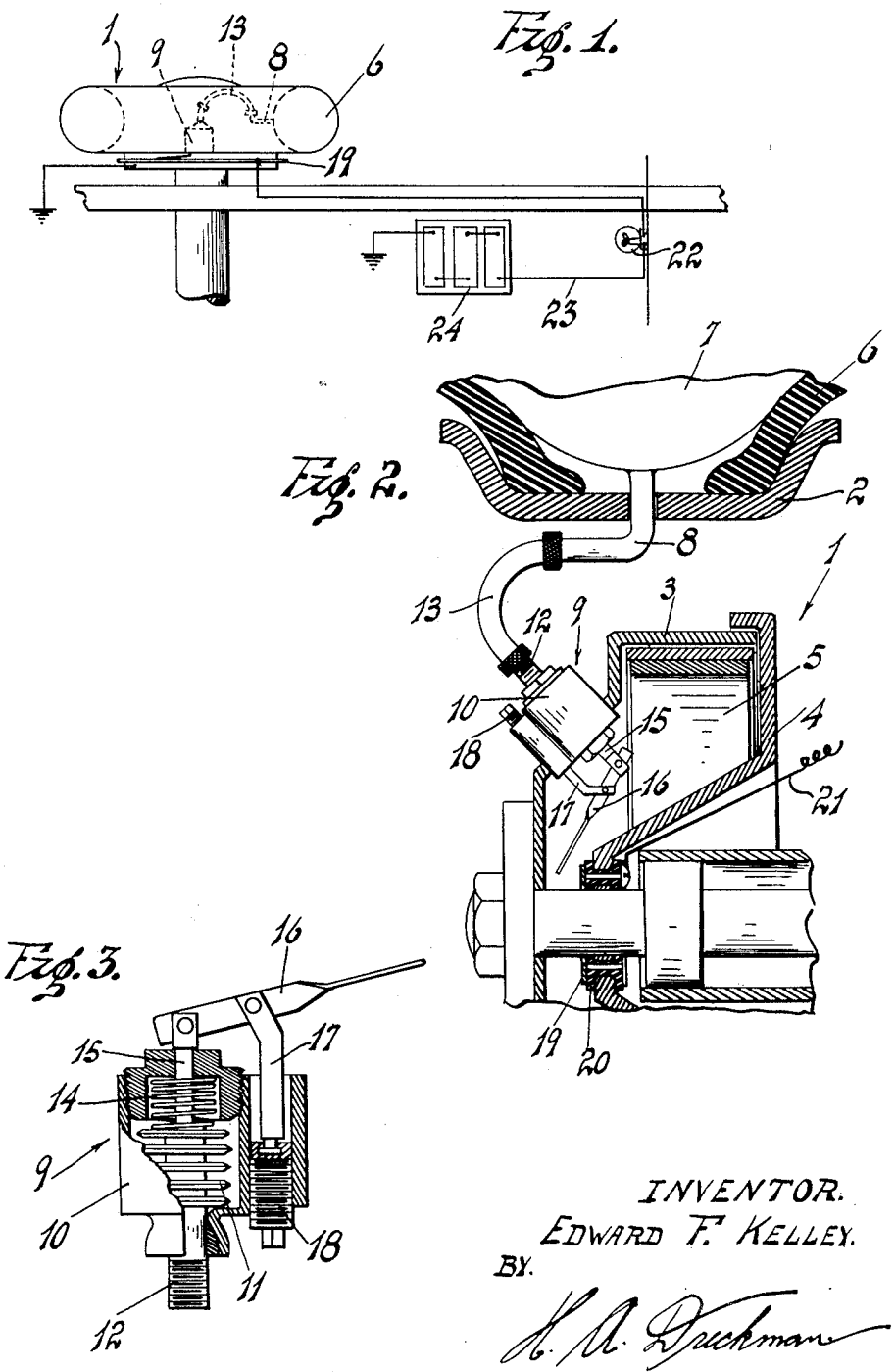
INVENTOR.
EDWARD F. KELLEY.
BY
ATTORNEY.

UNITED STATES PATENT OFFICE 2,082,341

TIRE DEFLATION INDICATOR

Edward F. Kelley, El Paso, Tex.

Application June 22, 1934, Serial No. 731,909

2 Claims. (Cl. 200—58)

This invention relates to a tire deflation indicator whereby a reduction in pressure within a vehicle tire is indicated to the driver of the vehicle.

An object is to provide an indicator system of the character stated which is simple in construction, the pressure controlled contact finger of which can be readily mounted upon vehicle wheels of modern design, and which can be readily adjusted so as to vary the sensitivity of the indicator.

Other objects, advantages and features of invention may appear from the accompanying drawing, the subjoined detailed description, and the appended claims.

In the drawing:

Figure 1 is a diagrammatic view of my indicator which includes the wiring arrangement.

Figure 2 is a fragmentary vertical sectional view of a wheel with my indicator mounted thereon.

Figure 3 is a side view, partly in section, of the pressure responsive member.

Referring more particularly to the drawing, the numeral 1 indicates a vehicle wheel of usual and well known design, including a rim 2, a brake drum 3, a stationary weather guard 4, and the usual brake shoe assembly 5.

A tire 6 is mounted on the rim 2 and the tire includes an inner tube 7 and a valve stem 8. A pressure responsive member 9 is mounted on the wheel 1 and rotates therewith. This member may be mounted on any suitable part of the wheel, and is here shown secured to and extending thru the brake drum 3.

The member 9 includes a housing 10 within which a diaphragm or bellows 11 is mounted. A nipple 12 extends thru the housing 10, and is secured to the lower end of the bellows 11. This nipple is preferably soldered securely in position so as not to move. A flexible tube 13 is attached to the valve stem 8 and to the nipple 12, thus transmitting air under pressure from the inner tube 7 to the bellows 11. Under pressure, the bellows 11 will be extended against the spring 14 which is mounted within the housing 9 and bears against the top of the bellows.

A pin 15 is attached to the upper end of the bellows 11 and projects thru the top of the housing 9. A contact arm 16 is pivotally secured to the pin 15 and also to an adjusting link 17. This adjusting link rises out of the housing 9 and is adjusted relative to this housing by a threaded bolt 18. The bolt screws into the lower end of the housing 9 adjacent to the bellows 11, and a link 17 is attached to the upper end of the bolt by a suitable swivelling coupling. It will be evident that by adjusting the bolt 18, the link 17 will be moved out or in, and thus the angle of the arm 16 can be varied. The purpose of this arrangement is to space the end of the contact arm 16 from the contact ring so that a certain drop in the pressure in the tire will form a contact and set off a visible indicator.

A contact ring 19 is stationary and is insulated from the wheel by a holder 20. The ring 19 may be attached to any suitable stationary part of the wheel construction, such as the weatherguard, the brake shoe mounting, or the like.

A wire 21 extends from the ring 19 to a signal light 22 on the dash of the vehicle. A second wire 23 extends from the light to one pole of the battery 24. The other pole of the battery is grounded to the frame of the vehicle, and since the housing 9 is secured to a metal part of the vehicle, it also is grounded. Therefore, the contact arm 16 extends to ground and when this arm contacts the ring 19, an electrical circuit will be completed and the light 22 will be lit.

Under normal pressure in the tube 7, the bellows 11 will be extended and the contact arm 16 will be swung out of engagement with the ring 19, as shown in Figure 2. If the pressure in the tube decreases, the spring 14 will compress the bellows 11, thus swinging the arm 16 on its pivot on the link 17, thus bringing the outer end of the arm in contact with the ring 19. The electrical circuit is thus completed and the light will indicate a reduced pressure in the tire. By adjusting the link 17 the pressure at which the circuit will be completed can be varied, i. e., the contact arm 16 must move a greater or a lesser amount before engaging the contact ring 19.

Having described my invention, I claim:

1. In a tire deflation indicator system a pressure responsive member adapted to be attached to a vehicle wheel, said member including a housing, extensible bellows in the housing, a hose connecting said bellows and a vehicle valve stem, a contact arm pivotally attached to one end of the bellows, an adjusting link, a bolt screwed into said housing, said adjusting link being swivelly attached to the bolt, said link being pivotally attached to said arm, and said arm being adapted to engage a contact.

2. In a tire deflation indicator system a pressure responsive member adapted to be attached to a vehicle wheel, said member including a housing, extensible bellows in the housing, a hose connecting said bellows and a vehicle valve stem, a contact arm pivotally attached to one end of the bellows, an adjusting link, a mounting means on the housing for said adjusting link, and means whereby said mounting means can be vertically adjusted in the housing.

EDWARD F. KELLEY.